D. VAN LAW.
WHEEL MOUNTING.
APPLICATION FILED AUG. 12, 1914.
1,155,175.
Patented Sept. 28, 1915.
2 SHEETS—SHEET 1.
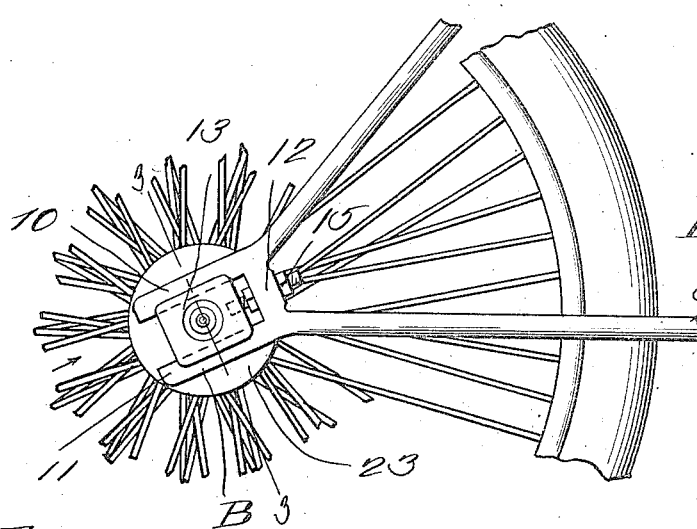
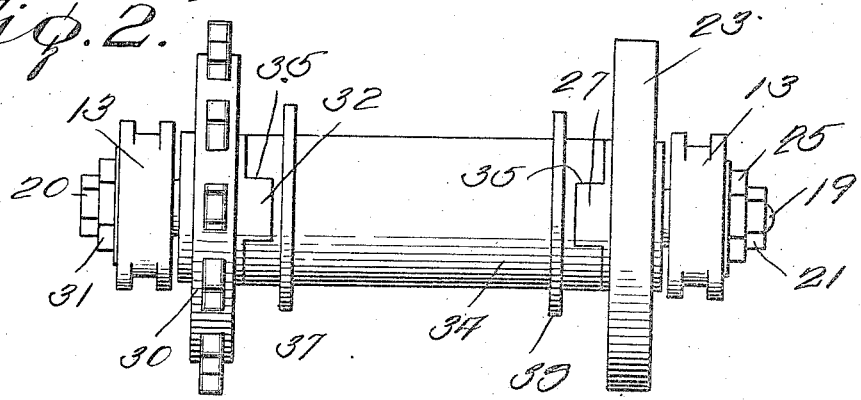
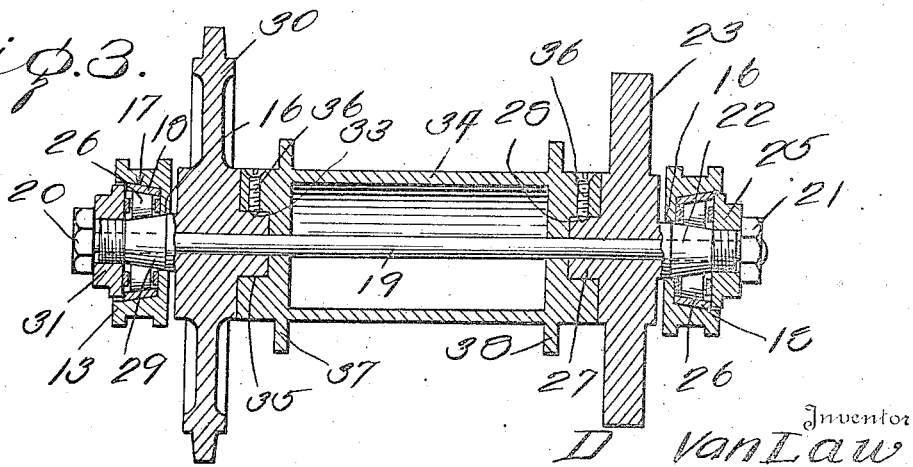

D. VAN LAW.
WHEEL MOUNTING.
APPLICATION FILED AUG. 12, 1914.
1,155,175.
Patented Sept. 28, 1915.
2 SHEETS—SHEET 2.
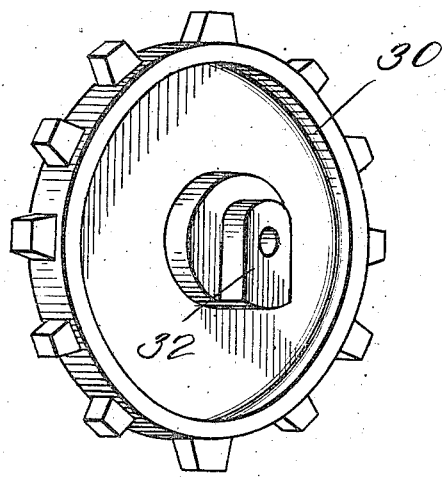
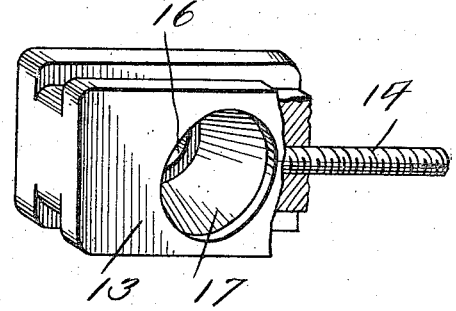
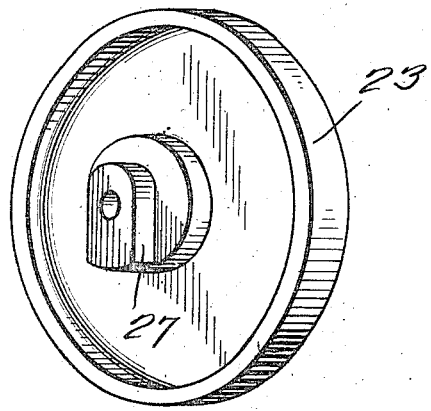
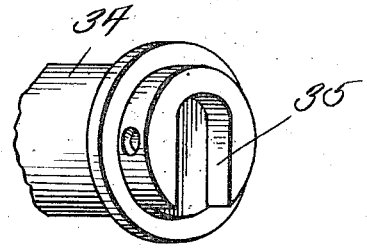

UNITED STATES PATENT OFFICE.

DURBIN VAN LAW, OF BISHOP, CALIFORNIA.

WHEEL-MOUNTING.

1,155,175.  Specification of Letters Patent.  Patented Sept. 28, 1915.

Application filed August 12, 1914. Serial No. 856,437.

*To all whom it may concern:*

Be it known that I, DURBIN VAN LAW, a citizen of the United States, residing at Bishop, in the county of Inyo, State of California, have invented certain new and useful Improvements in Wheel-Mountings; and I do hereby declare the following to be a full, clear, and exact description of the invention, such as will enable others skilled in the art to which it appertains to make and use the same.

This invention relates to wheel mountings and particularly to mountings for the rear wheels of two wheel vehicles such as bicycles and motor cycles.

On the standard makes of two wheel vehicles the rear wheel is mounted upon a stationary axle with internal bearings working inside the revolving hub of the rear wheel. In such structures, the rear wheel can only be removed by disconnecting the ends of the axle from the forks or frame supports. This operation necessitates the loosening of the nuts on the threaded ends of the axle, removing the wheel alinement screws and rings, disjointing the chain, and disconnecting the brake band and connecting rod. Such removal of the rear wheel is an absolute necessity when a certain class of tire repairs and removal and substitution of tires have to be made. Under present conditions the operation is a tedious one involving considerable time, and disagreeable work when performed on the road.

It is therefore the object of the present invention to facilitate the removal of the rear or driving wheel of any two wheel vehicle, or of any vehicle where the power is applied to a single wheel having a forked support for the axle, whereby quick tire repairs or changes, and also such other repairs as can be best accomplished with the wheel demounted, are rendered possible.

A further object of the invention resides in a wheel mounting of the character referred to so constructed that the removal of the wheel from the vehicle can be accomplished without disconnecting the drive chain or brake and without molesting the wheel alinement screws and rings.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side view of the rear end of a bicycle showing the invention applied; Fig. 2, a rear view of what is shown in Fig. 1 with the spokes and rim of the wheel removed and looking in the direction of the arrow in Fig. 1, same being on an enlarged scale with respect to Fig. 1; Fig. 3, a section on the line 3—3 of Fig. 1 on an enlarged scale; Fig. 4, a fragmental perspective view of one of the alinement rings with its screw mounted therein; Fig. 5, a perspective view of one end of the hub; Fig. 6, a perspective view of the sprocket wheel employed in the mounting; and Fig. 7, a perspective view of the brake drum employed in the mounting.

Referring to the drawings A indicates the rear portion of the frame of a bicycle. This frame is provided at its extreme rear end with the usual spaced forks B each of which includes arms 10 and 11 connected at their inner ends by a bar 12. Slidably mounted between each pair of arms 10 and 11 is an alinement ring 13 having threaded in the forward end thereof a stud 14 which passes through an opening in the adjacent bar 12 and has threaded thereon nuts 15 disposed on opposite sides of the bar 12 respectively and whereby the stud may be adjusted longitudinally to effect a desired adjustment of the associated alinement ring 13. Each of the alinement rings 13 is provided with a transverse passage 16 having an enlarged flared outer portion 17 in which is disposed a bearing race 18. Extending through the passages 16 of respective alinement rings 13 is a bolt 19 having a fixed head 20 on one end and a nut 21 threaded on the opposite end. Rotatably mounted in one of the alinement rings 13 is a hub extension 22 of a brake drum 23, said extension passing through the passage 16 of the alinement ring and having threaded thereon a retaining nut 25 adapted to exert a thrust against the bearing race 18, said race in this instance being shown as carrying roller bearings 26 upon which the extension 22 rotates. The inner end of the hub of the brake drum is provided with an extension 27 running transversely of the hub and having one end flush with the periphery of the hub and its other end spaced from said periphery. One edge of the extension 27 is provided with a recess 28 for a purpose that will presently appear.

Rotatably mounted in the other alinement ring 13 is a hub extension 29 of a sprocket wheel 30, said extension passing through the passage 16 of the alinement ring and having threaded thereon a retaining nut 31 adapted to exert a thrust against the bearing race 18. The inner end of the hub of the sprocket wheel 30 is provided with an extension 32 running transversely of the hub and having one end flush with the periphery of the hub and its other end spaced from said periphery. One edge of the extension 32 is provided with a recess 33 for a purpose that will presently appear. It will be noted that the extension 32 is similar in every respect to the extension 27 on the hub of the brake drum.

The improved mounting further embodies a hub 34 encircling the bolt 19 and disposed between the brake drum 23 and the sprocket wheel 30. Each end of the hub 34 is provided with a recess 35 in which the extensions 27 and 32 are detachably engaged by movement of the hub in the plane of the frame A. When the extensions 27 and 32 are seated in respective recesses 35, screws 36 carried by the hub 34 are operated so as to engage respectively in the recesses 28 and 33 whereby said extensions are locked against disengagement from the recesses. The hub 34 is provided with circumscribing spoke securing flanges 37 and 38 whereby the complete wheel may be built up thereon in the usual and well known manner.

In order to remove the hub it is only necessary to withdraw the screws 36 from the recesses 28 and 33 and then remove the nut 21 and withdraw the bolt 19. The rim of the wheel associated with the hub 34 is then grasped and the wheel pulled in the plane of the frame A so as to disengage the extensions 27 and 32 from the recesses 35 when the removal of the wheel is completed. By reversing the operation just described it will be obvious that the wheel can be reapplied. During the operations just described it will be apparent that the alinement rings, sprocket wheel and brake drum are not disturbed.

While one form of carrying the invention into practice has been illustrated and described it will be apparent that various changes in details and arrangements can be resorted to without departing from the scope of the invention as set forth in the appended claims and the invention is therefore in no way limited to the specific construction illustrated and described.

What is claimed is:—

1. In a wheel mounting, the combination of a support, a pair of spaced bearings mounted on the support, an element rotatably mounted in each bearing, and a hub between said elements detachably interlocking therewith.

2. In a wheel mounting, the combination of a support, a pair of spaced bearings mounted on the support, an element rotatably mounted in each bearing, and a hub between said elements detachably interlocking therewith and adapted to be disengaged from the elements by bodily movement in a plane at right angles to its axis of rotation.

3. In a wheel mounting, the combination of a support, a pair of spaced bearings mounted on the support, an element rotatably mounted in each bearing, a hub having its end portions slidably interlocked with respective end portions of the elements and adapted to be disengaged from the elements by bodily movement in a plane at right angles to its axis of rotation, and means for locking the hub against bodily movement relatively to the elements.

4. In a wheel mounting, the combination of a support, a pair of spaced bearings mounted on the support, an element rotatably mounted in each bearing, projections on the adjacent ends of said elements and a hub having its end portions provided with transverse recesses respectively, said recesses opening through one side of the hub and adapted to receive the projections on the elements respectively to detachably interlock the hub and elements together.

In testimony whereof, I affix my signature, in the presence of two witnesses.

DURBIN VAN LAW.

Witnesses:
  GEORGE E. VILLETT,
  J. W. SHUTE, M. D.

Copies of this patent may be obtained for five cents each, by addressing the "Commissioner of Patents, Washington, D. C."